United States Patent
Hart et al.

(10) Patent No.: US 10,177,427 B2
(45) Date of Patent: Jan. 8, 2019

(54) ELECTROCHEMICAL CELL FOR USE IN HIGH TEMPERATURE METAL-AIR BATTERY

(71) Applicant: General Electric Company, Schenectady, NY (US)

(72) Inventors: Richard Louis Hart, Broadalbin, NY (US); Sergei Kniajanski, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 142 days.

(21) Appl. No.: 15/430,210

(22) Filed: Feb. 10, 2017

(65) Prior Publication Data
US 2018/0233792 A1    Aug. 16, 2018

(51) Int. Cl.
| | | |
|---|---|---|
| *H01M 12/08* | (2006.01) | |
| *H01M 8/1253* | (2016.01) | |
| *H01M 8/14* | (2006.01) | |
| *H01M 4/38* | (2006.01) | |
| *H01M 4/86* | (2006.01) | |
| *H01M 8/124* | (2016.01) | |
| *H01M 4/02* | (2006.01) | |

(52) U.S. Cl.
CPC ............ *H01M 12/08* (2013.01); *H01M 4/38* (2013.01); *H01M 4/8615* (2013.01); *H01M 4/8621* (2013.01); *H01M 8/1253* (2013.01); *H01M 8/144* (2013.01); *H01M 2004/027* (2013.01); *H01M 2004/8689* (2013.01); *H01M 2008/1293* (2013.01); *H01M 2300/0077* (2013.01)

(58) Field of Classification Search
CPC ........................... H01M 12/08; H01M 4/8615
See application file for complete search history.

(56) References Cited

U.S. PATENT DOCUMENTS

| | | | |
|---|---|---|---|
| 7,344,801 | B2 | 3/2008 | Cheng et al. |
| 7,939,205 | B2 | 5/2011 | Klaassen |
| 8,592,092 | B2 | 11/2013 | Suto |
| 9,337,499 | B2 | 5/2016 | Whitfield |
| 9,343,787 | B2 | 5/2016 | Takechi et al. |
| 2006/0228622 | A1 | 10/2006 | Cohen et al. |
| 2015/0125763 | A1 | 5/2015 | Zheng et al. |

FOREIGN PATENT DOCUMENTS

WO    2016150228 A1    9/2016

OTHER PUBLICATIONS

Cohen et al., "A Dual Electrolyte H2/O2 Planar Membraneless Microchannel Fuel Cell System with Open Circuit Potentials in Excess of 1.4 V", Langmuir, vol. 21, Issue: 8, pp. 3544-3550, 2005.
Cheng et al., "High-Voltage Dual Electrolyte Electrochemical Power Sources", ECS Transactions, vol. 25, Issue: 35, pp. 213-219, 2010.
Andrei et al., "Modeling of Li-Air Batteries with Dual Electrolyte", Journal of the Electrochemical Society, vol. 159, Issue: 6, pp. A770-A780, 2012.

*Primary Examiner* — Olatunji A Godo
(74) *Attorney, Agent, or Firm* — GE Global Patent Operation; Nitin Joshi

(57) ABSTRACT

An electrochemical cell includes a bifunctional air cathode, an anode, and a ceramic electrolyte separator disposed substantially between the bifunctional air cathode and the anode. The anode includes a solid metal and a liquid electrolyte phase. The liquid electrolyte phase includes at least one of an alkali oxide, boron oxide, a group V transition metal oxide, and a group VI transition metal oxide.

24 Claims, 2 Drawing Sheets

ELECTROCHEMICAL CELL FOR USE IN HIGH TEMPERATURE METAL-AIR BATTERY

BACKGROUND

The subject matter disclosed herein relates to a highly energy dense, rechargeable electrochemical cell for use in a metal-air battery and, more particularly, to a highly energy dense electrochemical cell that includes a metal anode that is combined with a liquid electrolyte and that is configured to operate at high temperatures.

At least some known high temperature metal-air ("HTMA") batteries have been developed for use with electrical power systems having substantial energy density requirements. However, such known HTMA batteries may not be well suited to such applications, because these batteries may not be entitled to very high energy densities, such as, for example, energy densities close or exceeding one-thousand watt-hours/kilogram (Wh/Kg) at cell level.

Some of these known HTMA batteries utilize a molten carbonate electrolyte, while others incorporate a ceramic electrolyte for use as a separator between the anode and the cathode, and/or as an oxide conductor within the anode. HTMA batteries incorporating a molten carbonate electrolyte may suffer from self-discharge and may be limited to a narrow voltage window due to electrochemical instability of the carbonate anion. HTMA batteries incorporating a ceramic electrolyte may be limited to metals in liquid state at the battery operation temperature. This circumstance may afford anode compositions having relatively low energy densities and/or slow kinetics of recharge.

BRIEF DESCRIPTION

In one aspect, an electrochemical cell is provided. The electrochemical cell includes a bifunctional air cathode, an anode, and a ceramic electrolyte separator disposed substantially between the bifunctional air cathode and the anode. The anode includes a solid metal and a liquid electrolyte phase. The liquid electrolyte phase includes at least one of an alkali oxide, boron oxide, a group V transition metal oxide, and a group VI transition metal oxide.

In another aspect, an electrochemical cell is provided. The electrochemical cell includes a tubular ceramic electrolyte separator comprising an inner surface and an outer surface, an anode disposed within the tubular ceramic electrolyte separator, a negative terminal disposed at least partially within the anode and extending out of the anode, and a bifunctional air cathode disposed at least partially about the outer surface of the tubular ceramic electrolyte separator. The anode includes a solid metal and a liquid electrolyte phase. The liquid electrolyte phase includes at least one of an alkali oxide, boron oxide, a group V transition metal oxide, and a group VI transition metal oxide.

In yet another aspect, a method for storing and generating electrical charge is provided. The method includes coupling an electrochemical cell to a current source to charge the electrochemical cell, and coupling the electrochemical cell to an electrical load to discharge the electrochemical cell. The electrochemical cell includes a bifunctional air cathode, an anode, and a ceramic electrolyte separator disposed substantially between the bifunctional air cathode and the anode. The anode includes a solid metal and a liquid electrolyte phase. The liquid electrolyte phase includes at least one of an alkali oxide, boron oxide, a group V transition metal oxide, and a group VI transition metal oxide.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to a metal-air electrochemical cell that includes a bifunctional cathode, a ceramic electrolyte separator, and an anode. The bifunctional cathode is ionically and electrically conductive and is capable of oxygen reduction to an oxide, and oxide ion oxidation to oxygen, as well. The anode includes a metal, such as iron, and an electrolyte that is configured to enter a molten liquid phase (or liquefied) as the electrochemical cell approaches a nominal operating temperature. As the electrolyte in the anode liquefies, a contact area between the anode and the separator is increased, and oxide ions produced in the cathode are easily conducted into the anode, where a redox reaction takes place. As a result of the redox reaction in the anode, the electrochemical cell produces electrical current.

Figure 1:
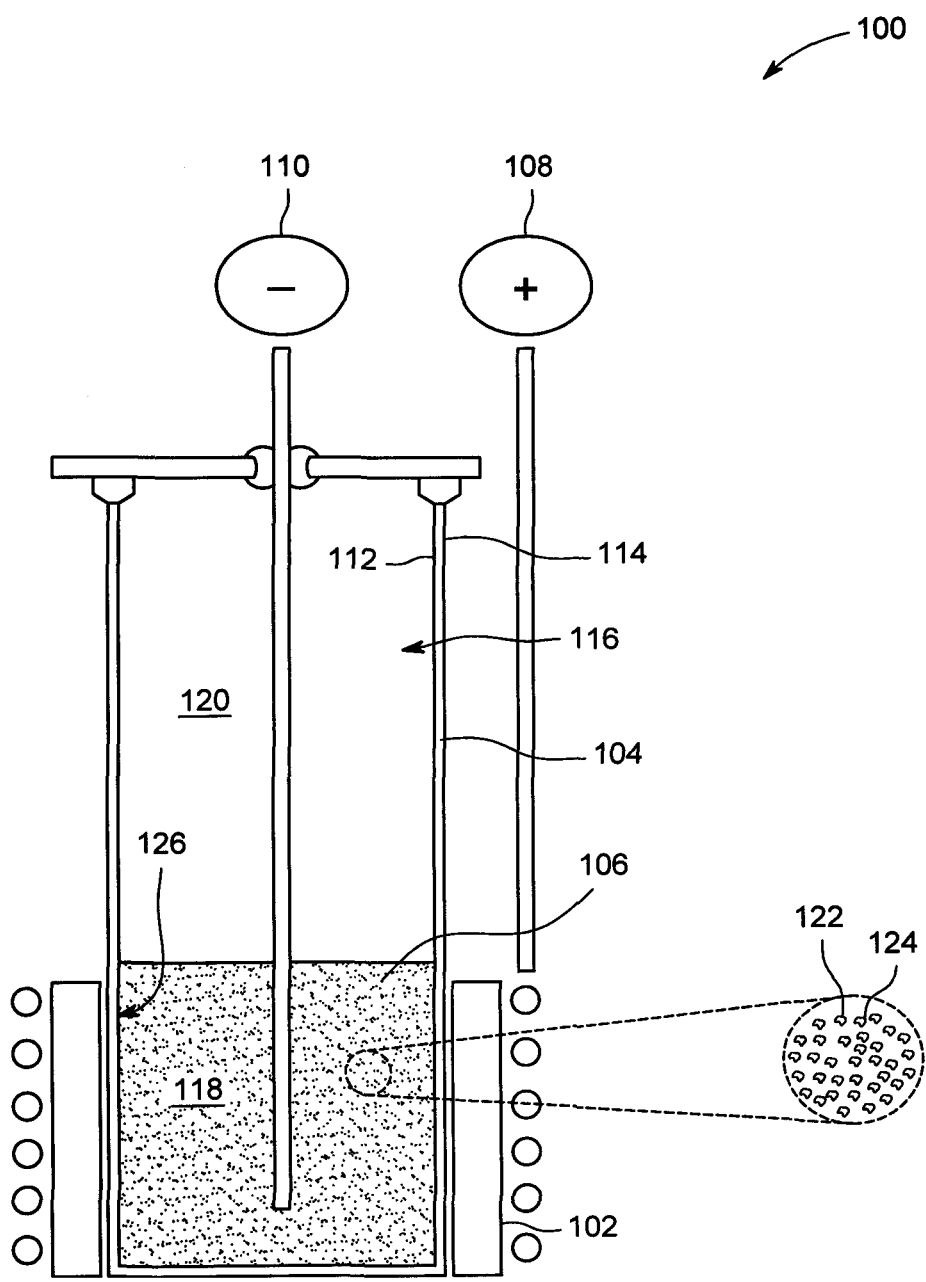
FIG. 1 is a cross-sectional view of an exemplary electrochemical cell.

FIG. 1 is a cross-sectional view of an exemplary electrochemical cell 100. As described herein, electrochemical cell 100 is capable of operation as a secondary, or rechargeable, electrochemical cell. Electrochemical cell 100 may be electrically coupled to one or more other electrochemical cells 100 to produce a high temperature metal air battery. In addition, and as described in greater detail below, electrochemical cell 100 is configured to operate at temperatures in the range of 500-1000 degrees Celsius. In some embodiments, depending upon electrochemical cell composition and materials chosen, electrochemical cell 100 operates in the range of 300-1000 degrees Celsius. Thus, electrochemical cell 100 may be regarded as a "high temperature" electrochemical cell.

Accordingly, electrochemical cell 100 includes a positive electrode (or cathode), such as a bifunctional air cathode 102, a separator 104, and a negative electrode (or anode) 106. In general, separator 104 is disposed between cathode 102 and anode 106 and separates cathode 102 from anode 106. Electrochemical cell 100 also includes a positive terminal 108 and a negative terminal 110. Positive terminal 108 is coupled to cathode 102, and negative terminal 110 is coupled to anode 106. In some embodiments, and as shown, negative terminal 110 is inserted within or disposed within anode 106. In addition, in some embodiments, cathode 102 functions as positive terminal 108.

In the exemplary embodiment, separator 104 is a tubular structure having an inner surface 112 and an outer surface 114. However, separator 104 is not limited to a tubular shape, and in different embodiments, separator 104 is, for example, planar, rectangular, and/or any other suitable shape. In some embodiments, cathode 102 is disposed at least partially about outer surface 114 of separator 104. In addition, in some embodiments, separator 104 defines a compartment 116.

Compartment 116 is divided into two sections or regions, such as first region 118 and a second region 120. First region 118 contains anode 106, and second region 120 is substantially empty in charged state. As described below, during a discharge cycle, anode 106 is oxidized and expands into second region 120. Similarly, during a recharge cycle, as the reaction is driven in reverse, anode 106 is reduced and contracts or withdraws from second region 120. Thus, compartment 116 is large enough to accommodate anode 106 as it expands and contracts.

Bifunctional air cathode 102 is gas permeable, ionically and electrically conductive, and is configured to facilitate both oxygen ion reduction and oxide oxidation. In some embodiments, cathode 102 includes one or more catalysts to facilitate oxygen reduction and oxide oxidation. Thus, as used herein, cathode 102 may be regarded as an "air cathode." The material composition of cathode 102 may vary. In the exemplary embodiment, cathode 102 is any ceramic material or any combination of ceramic materials, such as, for example, and without limitation, lanthanum strontium chromium ferrite (LSCrFeO$_x$), a mixture of lanthanum strontium manganite (LSM) and yttria stabilized zirconia (YSZ), and/or a mixture of gadolinium doped ceria (GDC) and LSM. In other embodiments, cathode 102 may include combinations of one or more ceramic materials and/or one or more metals.

Separator 104 is a dense, non-porous, ceramic structure, and is configured to conduct oxide ions between cathode 102 and anode 106. In some embodiments, separator 104 is gas and liquid impermeable. In addition, in the exemplary embodiment, separator 104 includes a ceramic electrolyte, such as, for example, YSZ.

Anode 106 is a composition or mixture of an electrolyte 122 and a metal 124. Metal 124 of anode 106 is a transition metal and/or a metal capable of redox behavior, such as, for example, and without limitation, iron powder or iron shavings. In the exemplary embodiment, metal 124 is any of, or any combination of, vanadium (V), niobium (Nb), tantalum (Ta), manganese (Mn), and/or iron (Fe). However, in other embodiments, chromium (Cr), cobalt (Co), nickel (Ni), and/or copper (Cu) may be used. Lower melting transition metals, such as zinc (Zn), or other low melting metals, such as lithium (Li) or antimony (Sb), may be used in alloys with or without other metals at lower temperatures where they remain solid.

Electrolyte 122 is a compound or a mixture of compounds and is configured to become a molten liquid phase (liquefy) at the operating temperature of electrochemical cell 100, such as temperatures in the range of 500-1000 degrees Celsius. At room temperature, electrolyte 122 may exist in a solid phase. Electrolyte 122 has a relatively low viscosity and is chemically labile with respect to oxygen. Electrolyte 122 is also chemically stable at the operating temperature of electrochemical cell 100 and, in at least some embodiments, does not undergo electrochemical transformations at the operating voltage of electrochemical cell 100. Further, the composition of electrolyte 122 can be adjusted, as described herein, based upon the composition of metal 124.

Accordingly, in various embodiments, electrolyte 122 includes alkali carbonates (e.g., mixtures of lithium-sodium-potassium carbonates having melting points within the operating temperature), alkali borates (e.g., various molar compositions of boron trioxide and/or lithium, and/or sodium oxide), group V and/or group VI transition metal oxides, which may be in their highest oxidation states, or which may transition to their highest oxidation states during operation (e.g., vanadium pentoxide). In some embodiments, electrolyte 122 is mixed with one or more alkali chlorides, such as eutectic mixtures of potassium chloride and sodium chloride. Admixture with alkali chlorides is effective to, for example, reduce viscosity, increase ionic conductivity, and/or impair partial solubility of discharge product (e.g., metal oxide) in electrolyte 122. In the exemplary embodiment, electrolyte 122 includes 20 molar % of boron trioxide ($B_2O_3$) and 80 molar % of sodium oxide ($Na_2O$). In another exemplary embodiment, electrolyte 122 includes 25 mol % of sodium chloride (NaCl), 25 mol % of potassium chloride (KCl), 35 mol % of rubidium carbonate ($Rb_2CO_3$), and 15 mol % of boron trioxide ($B_2O_3$). In yet another embodiment, electrolyte 122 includes 20 mol % of sodium chloride (NaCl), 20 mol % of potassium chloride (KCl), 45 mol % of sodium oxide ($Na_2O$), and 15 mol % of boron trioxide ($B_2O_3$). In further embodiment, electrolyte 122 is vanadium pentoxide ($V_2O_5$).

Electrolyte 122 is mixed with metal 124 of anode 106 to improve "wetting" between anode 106 and separator 104. Specifically, the introduction of electrolyte 122 forms a liquid-solid anode-separator interface 126. Anode-separator interface 126 increases the contact area between anode 106 and separator 104 when electrolyte 122 is in a molten liquid phase, which, in turn, improves oxygen ion conductivity between separator 104 and anode 106. As a result, a greater number of oxygen ions are transferred between separator 104 and anode 106.

In operation, atmospheric oxygen is absorbed by cathode 102 and reduced therein to form oxide ions. The oxide ions produced by the reduction reaction occurring within cathode 102 diffuse through separator 104. As oxide ions exit separator 104 at anode-separator interface 126, they are transferred to anode 106 via electrolyte 122, and metal 124 is oxidized (and forms a metal oxide). Electrons are released during the oxidation reaction in anode 106 and collected by negative terminal 110. The electrons flow to cathode 104 through an electrical load (not shown) coupled between positive terminal 108 and negative terminal 110 or, if there is no electrical load, an open circuit voltage between positive terminal 108 and negative terminal 110 is developed.

As described above, during a discharge cycle, the volume of anode 106 increases as anode 106 forms a metal oxide. In some embodiments, (e.g., where Li and Mg are used), the volume of anode 106 may not increase. Second region 120 of compartment 116 therefore facilitates expansion of anode 106 during discharge of electrochemical cell 100. In addition, during a recharge cycle, the reaction is driven in reverse, such that the metal oxide produced during discharge is reduced to obtain metal 124. As the reverse reaction occurs, anode 106 contracts within compartment 116 into first region 118.

Figure 2:
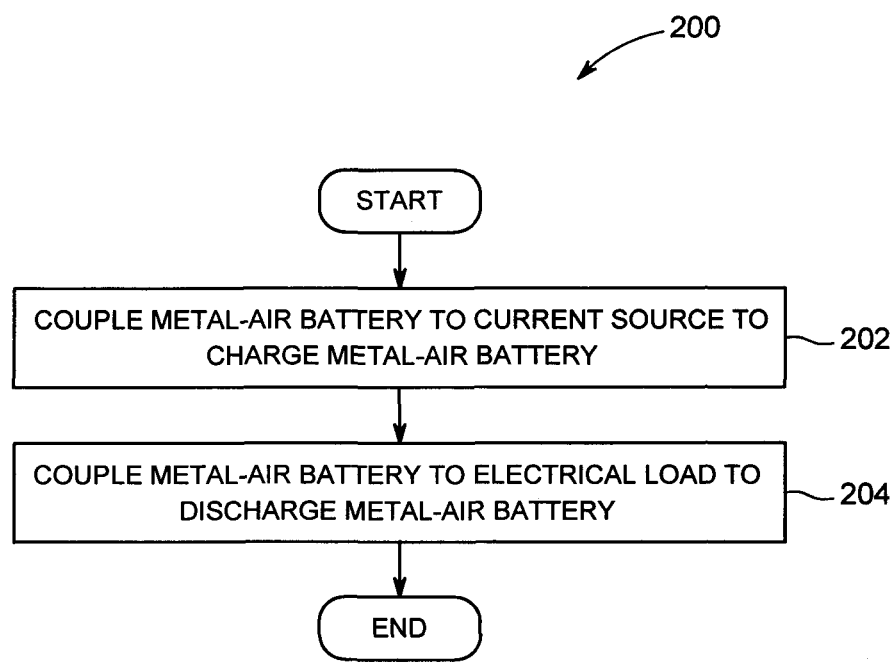
FIG. 2 is a flowchart illustrating a process for storing and generating electrical charge using the electrochemical cell shown in FIG. 1.

FIG. 2 is a flowchart illustrating a process 200 for storing and generating electrical charge using electrochemical cell 100. In general, process 200 includes coupling 202 electrochemical cell 100 to a current source (not shown) to charge electrochemical cell 100, and coupling electrochemical cell 100 to an electrical load (not shown) to discharge electrochemical cell 100 (shown in FIG. 1).

As a result of the high operating temperature of electrochemical cell 100 (approximately 500-1000 degrees Celsius), electrochemical cell 100 can be coupled to or implemented in proximity to a power system (not shown), such as a solid oxide fuel cell system, a steam turbine generator, a gas turbine engine, such as a jet or marine engine, a land-based gas turbine engine, a gasoline or diesel combustion engine, and/or any other power generation system that generates substantial waste heat or that is otherwise configured to operate at substantially high temperatures. The heat produced or required by the power generation system can be used or recycled to drive the redox reaction in electrochemical cell 100. In addition, under such conditions, electrochemical cell 100 may not require a separate climate control system (e.g., a battery case configured to maintain the temperature of electrochemical cell 100 at or near the nominal operating temperature).

Embodiments of the electrochemical cell, as described above, facilitate the generation of electrical current. The electrochemical cell includes a bifunctional cathode, an electrolyte separator, and an anode. The anode includes a metal, such as iron, and an electrolyte that is configured to enter a molten liquid phase as the electrochemical cell approaches a nominal operating temperature. As the electrolyte in the anode liquefies, a contact area between the anode and the separator is increased, and oxide ions produced in the cathode are easily conducted into the anode, where a redox reaction takes place, producing, as a result, electrical current.

Exemplary technical effects of the electrochemical cell described herein include, for example: (a) liquefaction of an electrolyte mixture in an anode at a nominal operating temperature in the range of 500-1000 degrees Celsius; (b) improved oxygen ion transfer between a ceramic separator and the anode at the nominal operating temperature as a result of liquefaction of the electrolyte in the anode; and (c) as a result, a secondary electrochemical cell having a substantial energy entitlement (e.g., exceeding 1000 Wh/Kg).

Exemplary embodiments of an electrochemical cell and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where an electrochemical cell is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrochemical cell comprising:
   a bifunctional air cathode;
   an anode comprising:
     a solid metal; and
     a liquid electrolyte phase comprising at least one of:
       an alkali oxide;
       boron oxide;
       a group V transition metal oxide; and
       a group VI transition metal oxide; and
   a ceramic electrolyte separator disposed substantially between said bifunctional air cathode and said anode.

2. The electrochemical cell of claim 1, wherein said electrochemical cell is configured to operate in a temperature range of 500-1000 degrees Celsius.

3. The electrochemical cell of claim 1, wherein said bifunctional cathode comprises one of lanthanum strontium chromium ferrite, a mixture of lanthanum strontium manganite and yttria stabilized zirconia, and a mixture of gadolinium doped ceria and yttria stabilized zirconia.

4. The electrochemical cell of claim 1, wherein said metal of said anode comprises at least one of vanadium, chromium, manganese, iron, cobalt, nickel, niobium, tantalum, or mixture thereof.

5. The electrochemical cell of claim 1, wherein said metal of said anode comprises iron.

6. The electrochemical cell of claim 1, wherein said metal of said anode comprises vanadium.

7. The electrochemical cell of claim 1, wherein said metal of said anode comprises manganese.

8. The electrochemical cell of claim 1, wherein said ceramic electrolyte separator comprises yttria stabilized zirconia.

9. The electrochemical cell of claim 1, wherein said electrolyte of said anode comprises a eutectic mixture of compounds.

10. The electrochemical cell of claim 1, wherein said electrolyte of said anode comprises at least one alkali chloride.

11. The electrochemical cell of claim 1, wherein said electrolyte of said anode forms a liquid-solid interface between said anode and said separator at a nominal operating temperature.

12. The electrochemical cell of claim 1, wherein said electrochemical cell is rechargeable.

13. An electrochemical cell comprising:
a tubular ceramic electrolyte separator comprising an inner surface and an outer surface;
an anode disposed within said tubular ceramic electrolyte separator, said anode comprising:
  a solid metal; and
  a liquid electrolyte phase comprising at least one of:
    an alkali oxide;
    boron oxide;
    a group V transition metal oxide; and
    a group VI transition metal oxide; and
a negative terminal disposed at least partially within said anode and extending out of said anode; and
a bifunctional air cathode disposed at least partially about said outer surface of said tubular ceramic electrolyte separator.

14. The electrochemical cell of claim 13, wherein said electrochemical cell is configured to operate in a temperature range of 500-1000 degrees Celsius.

15. The electrochemical cell of claim 13, wherein said bifunctional air cathode comprises one of lanthanum strontium chromium ferrite, a mixture of lanthanum strontium manganite and yttria stabilized zirconia, and a mixture of gadolinium doped ceria and yttria stabilized zirconia.

16. The electrochemical cell of claim 13, wherein said metal of said anode comprises at least one of vanadium, chromium, manganese, iron, cobalt, nickel, niobium, and tantalum.

17. The electrochemical cell of claim 13, wherein said metal of said anode comprises iron.

18. The electrochemical cell of claim 13, wherein said metal of said anode comprises vanadium.

19. The electrochemical cell of claim 13, wherein said metal of said anode comprises manganese.

20. The electrochemical cell of claim 13, wherein said ceramic electrolyte separator comprises yttria stabilized zirconia.

21. The electrochemical cell of claim 13, wherein said electrolyte of said anode comprises a eutectic mixture of compounds.

22. The electrochemical cell of claim 13, wherein said electrolyte of said anode comprises at least one alkali chloride.

23. The electrochemical cell of claim 13, wherein said electrolyte of said anode forms a liquid-solid interface between said anode and said separator at a nominal operating temperature.

24. A method for storing and generating electrical charge, said method comprising:
coupling an electrochemical cell to a current source to charge the electrochemical cell, the electrochemical cell comprising:
  a bifunctional air cathode;
  an anode comprising:
    a solid metal; and
    a liquid electrolyte phase comprising at least one of:
      an alkali oxide;
      boron oxide; and
      a group V transition metal oxide; and
      a group VI transition metal oxide; and
  a ceramic electrolyte separator disposed substantially between the ionically conductive cathode and the anode; and
coupling the electrochemical cell to an electrical load to discharge the electrochemical cell.

* * * * *